(12) United States Patent
Wang et al.

(10) Patent No.: US 12,202,370 B2
(45) Date of Patent: Jan. 21, 2025

(54) ELECTRIC VEHICLE CHARGING MANAGEMENT METHODS AND SYSTEMS WITH CHARGING RATE-BASED CHARGING

(71) Applicant: Noodoe Group Inc., Wilmington, DE (US)

(72) Inventors: John C. Wang, Taipei (TW); Yi-An Hou, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 482 days.

(21) Appl. No.: 17/582,035

(22) Filed: Jan. 24, 2022

(65) Prior Publication Data

US 2022/0305939 A1    Sep. 29, 2022

(30) Foreign Application Priority Data

Mar. 26, 2021   (TW) .................................. 110111197

(51) Int. Cl.
*B60L 53/63*      (2019.01)
*B60L 53/30*      (2019.01)
*B60L 53/62*      (2019.01)
*B60L 53/66*      (2019.01)
*B60L 53/67*      (2019.01)
*B60L 53/68*      (2019.01)

(52) U.S. Cl.
CPC ............. *B60L 53/63* (2019.02); *B60L 53/305* (2019.02); *B60L 53/62* (2019.02); *B60L 53/66* (2019.02); *B60L 53/67* (2019.02); *B60L 53/68* (2019.02)

(58) Field of Classification Search
USPC ............................................. 320/109
See application file for complete search history.

(56) References Cited

U.S. PATENT DOCUMENTS

2015/0306969 A1\* 10/2015 Sabripour ............... H02J 3/322
                                                           320/109
2017/0187210 A1\*  6/2017 Cogill ................... H04W 4/029
2020/0223319 A1\*  7/2020 Uhlenbrock ........... B60L 53/18

\* cited by examiner

*Primary Examiner* — Bryce M Aisaka
(74) *Attorney, Agent, or Firm* — McClure, Qualey & Rodack, LLP

(57) ABSTRACT

Electric vehicle charging management methods and systems with charging rate-based charging are provided. First, the server provides a charging rate corresponding to a charging field, wherein the charging rate is variable. A first specific electric vehicle charging station receives a connection corresponding to a first electric vehicle. The server transmits the charging rate of the charging field to a first mobile device via a second network, and receives a setting of a first specific rate from the first mobile device. When the charging rate is equal to or less than the first specific rate, the server transmits a charging start instruction to the first specific electric vehicle charging station via a first network, so that the first specific electric vehicle charging station starts to perform a charging operation to charge the first electric vehicle.

13 Claims, 10 Drawing Sheets

ELECTRIC VEHICLE CHARGING MANAGEMENT METHODS AND SYSTEMS WITH CHARGING RATE-BASED CHARGING

BACKGROUND OF THE INVENTION

Field of the Invention

The disclosure relates generally to charging management methods and systems for electric vehicles, and, more particularly to methods and systems that can perform charging managements for electric vehicles based on the charging rate of a charging field.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

With the increase in electric vehicles, the power consumption caused by electric vehicle charging has become one of the issues that governments, power plants, and charging fields are paying attention to. At the same time, in order to achieve a balance between power supply and consumption, the industry is also actively launching various solutions to face energy management issues. For example, the number of electric vehicle charging stations that can be installed in a single charging field is limited by the existing maximum load capacity of the charging field. Therefore, under the premise of not updating the power equipment, some charging fields can implement load balancing operations to increase the number of electric vehicle charging stations that can be installed in the field. In the load balancing operation, by reducing the power output of individual electric vehicle charging stations, more electric vehicles can be charged in this charging field at the same time. In another example, the power plant can sign a contract with the operator of the charging field to implement a demand response procedure during the peak of electricity consumption to reduce the output power of the electric vehicle charging stations. Through the demand response process, the power plant can avoid the crisis of insufficient power during the peak power consumption.

Generally, the charging rate of the charging field can be set according to the conditions of each field, such as the location of the charging field, or the peak or off-peak period. Through the charging rate setting, the utilization rate of electric vehicle charging stations can be increased. For example, through different peak or off-peak charging rates, lower charging rates can be used to attract car owners to charge during off-peak hours, thereby increasing the utilization rate of the charging field during off-peak hours. In the case of limited power, how to effectively and fully utilize power and pursue the maximum profit of the enterprise will become the latest issue in the industry.

BRIEF SUMMARY OF THE INVENTION

In an electric vehicle charging management method with charging rate-based charging, a charging rate corresponding to a charging field is provided by a server, wherein the charging rate is variable. A connection corresponding to a first electric vehicle is received by a first specific electric vehicle charging station. The charging rate of the charging field is transmitted to a first mobile device via a second network, and a setting of a first specific rate is received from the first mobile device by the server. When the charging rate is equal to or less than the first specific rate, a charging start instruction is sent to the first specific electric vehicle charging station via a first network by the server, so that the first specific electric vehicle charging station starts to perform a charging operation to charge the first electric vehicle.

An embodiment of an electric vehicle charging management system with charging rate-based charging includes a charging field with a plurality of electric vehicle charging stations and a server. A first specific electric vehicle charging station among the electric vehicle charging stations receives a connection of a first electric vehicle. The server connects with the respective electric vehicle charging stations via a first network, and provides a charging rate corresponding to the charging field, wherein the charging rate is variable. The server transmits the charging rate of the charging field to a first mobile device via a second network, and receives a setting of a first specific rate from the first mobile device. The server determines whether the charging rate is equal to or less than the first specific rate, and transmits a charging start instruction to the first specific electric vehicle charging station via a first network when the charging rate is equal to or less than the first specific rate, so that the first specific electric vehicle charging station starts to perform a charging operation to charge the first electric vehicle.

In some embodiments, the server receives a setting of a specific power amount from the first mobile device via the second network, and determines whether a charging power corresponding to the charging operation is equal to or greater than the specific power amount. When the charging power corresponding to the charging operation is equal to or greater than the specific power amount, the server transmits a charging stop instruction to the first specific electric vehicle charging station via the first network, so that the first specific electric vehicle charging station stops the charging operation.

In some embodiments, the server calculates a charging fee corresponding to the charging operation based on the charging rate of the charging field and the specific power amount.

In some embodiments, a connection of a second electric vehicle is received by a second specific electric vehicle charging station among the electric vehicle charging stations. The server receives a setting of a second specific rate from a second mobile device via a third network, and determines the charging rate corresponding to the charging field according to the first specific rate of the first mobile device and the second specific rate of the second mobile device.

In some embodiments, the server further executes an energy management scheme to perform a load balancing operation for the electric vehicle charging stations in the charging field, wherein the energy management scheme records a power distribution logic for controlling the charging operations corresponding to the respective electric vehicle charging stations. The server performs a change adjustment operation for the charging rate corresponding to the charging field when the load balancing operation is performed.

In some embodiments, the server connects to each of the electric vehicle charging stations in the charging field via the first network to obtain the usage status of each of the electric vehicle charging stations. The server determines the utilization rate of the charging field according to the usage status of each of the electric vehicle charging stations, and determines whether the utilization rate of the charging field is higher than a predetermined value. When the utilization rate of the charging field is higher than the predetermined value, the server performs a change adjustment operation of the charging rate of the charging field.

In some embodiments, the server determines the charging rate of the charging field according to the utilization rate of the charging field, the first specific rate of the first mobile device, and the second specific rate of the second mobile device.

In some embodiments, the server records change data of the charging rate of the charging field over time, generates graphical data based on the change data, and transmits the graphical data to the first mobile device via the second network.

Electric vehicle charging management methods with charging rate-based charging may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
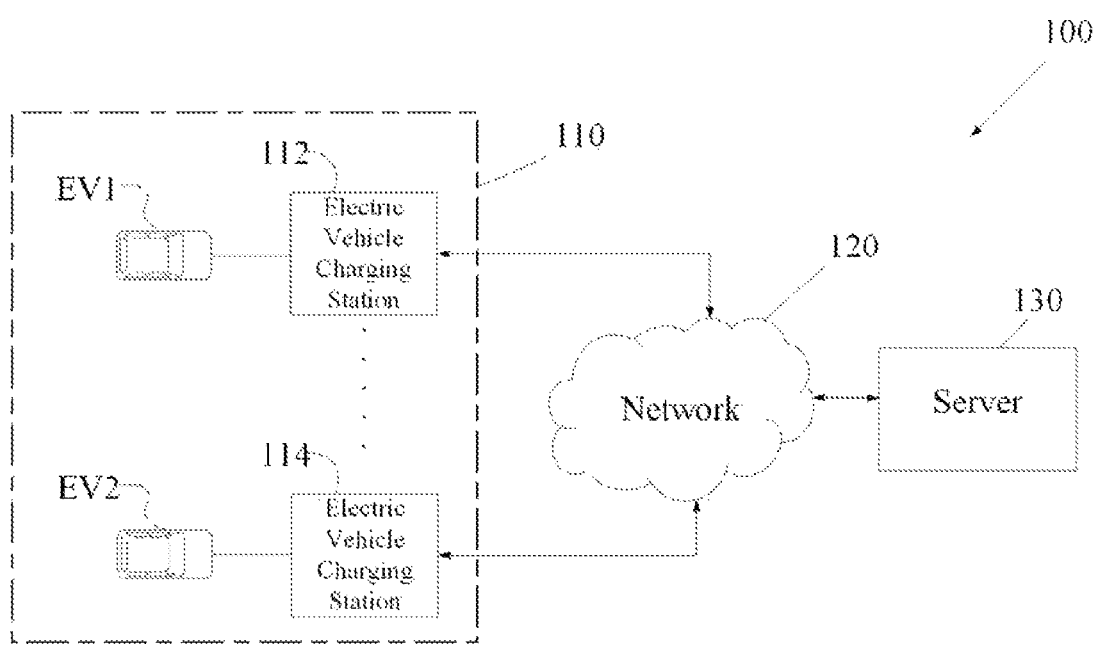
FIG. 1 is a schematic diagram illustrating an embodiment of an electric vehicle charging management system with charging rate-based charging of the invention.

FIG. 1 is a schematic diagram illustrating an embodiment of an electric vehicle charging management system with charging rate-based charging of the invention. The electric vehicle charging management system with charging rate-based charging 100 can be used in a charging filed 110 with a plurality of electric vehicle charging stations. It is noted that, the charging filed 110 has a power limitation. As shown in FIG. 1, the electric vehicle charging management system with charging rate-based charging 100 comprises a plurality of electric vehicle charging stations (112, 114), and a server 130 respectively connected with the respective electric vehicle charging stations via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the respective electric vehicle charging stations via the network 120, and transmit related signals to the respective electric vehicle charging stations. The respective electric vehicle charging stations can perform related operations according to the signals received from the server 130. For example, when the electric vehicle EV1 is coupled to the electric vehicle charging station 112 through a charging gun of the electric vehicle charging station 112 for a charging operation, the electric vehicle charging station 112 can continuously transmit charging information corresponding the charging operation of the electric vehicle EV1 via the network 120, and the server 130 can receive the charging information of the corresponding charging operation from the electric vehicle charging station 112 via the network 120. In some embodiments, the charging information may include at least a charging start time, a charging period, an output power, and/or related information indicating whether a load balancing operation is being performed. The server 130 can know the usage status of the corresponding electric vehicle charging station according to the charging information. Similarly, when the electric vehicle EV2 is coupled to the electric vehicle charging station 114 through a charging gun of the electric vehicle charging station 114 to perform a charging operation, the electric vehicle charging station 114 can continuously transmit the charging information corresponding the charging operation of the electric vehicle EV2 via the network 120, and the server 130 can receive the charging information of the corresponding charging operation from the electric vehicle charging station 114 via the network 120.

It is noted that the user can connect the electric vehicle EV1 and the electric vehicle charging station 112 to each other, such as inserting a charging gun into the charging port of the electric vehicle to send a charging request corresponding to the electric vehicle charging station 112 to use the electric vehicle charging station 112. The electric vehicle charging station 112 performs a charging operation for the electric vehicle EV1. Similarly, the user can connect the electric vehicle EV2 and the electric vehicle charging station 114 to each other, such as inserting a charging gun into the charging port of the electric vehicle to send a charging request corresponding to the electric vehicle charging station 114 to use the electric vehicle charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the electric vehicle charging station 112 via the network 120, so that the electric vehicle charging station 112 outputs power to the electric vehicle EV1, such as an electric scooter or an electric car, which is electrically connected to it, or prohibits the electric vehicle charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the electric vehicle charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the electric vehicle charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load balancing operation for the electric vehicle charging stations in the charging field 110 according to at least one energy management scheme. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle.

Figure 2:
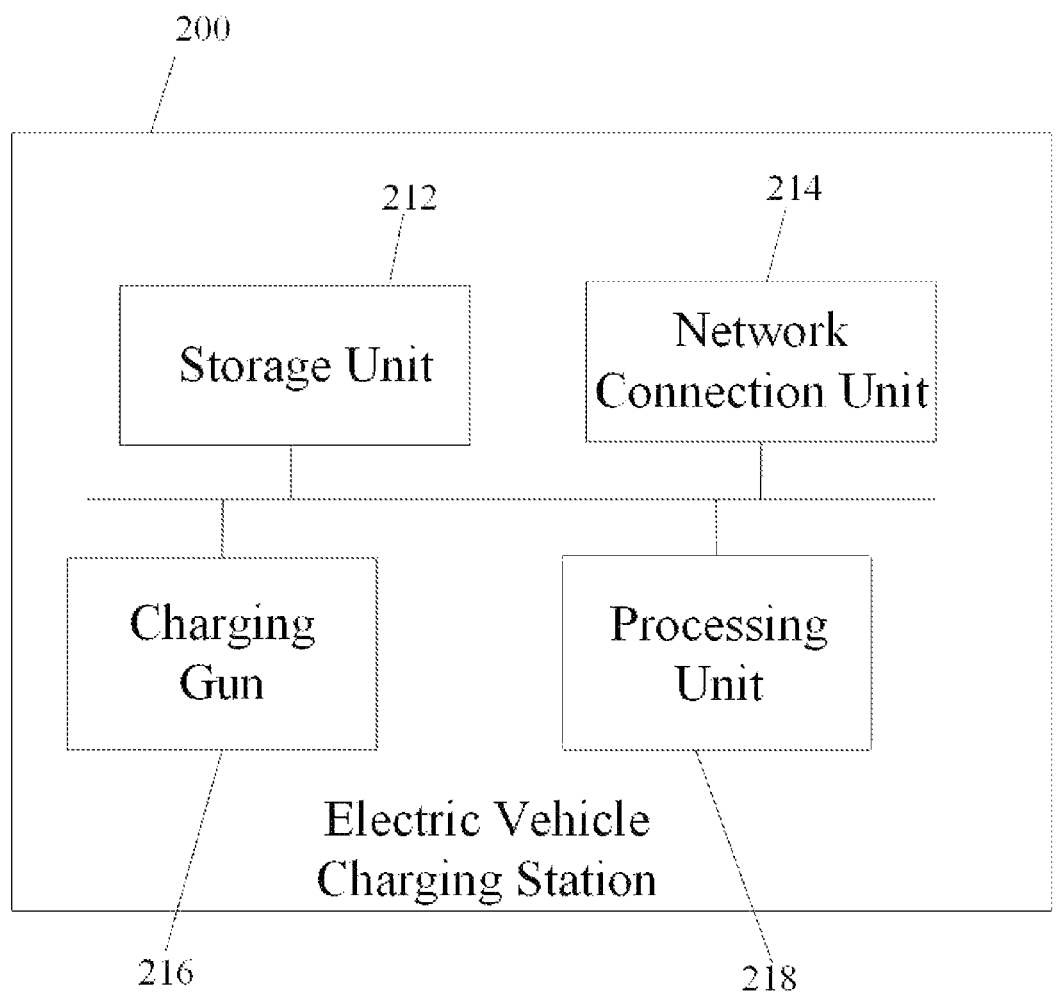
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the electric vehicle charging stations (112, 114) in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the electric vehicle charging management methods with charging rate-based charging of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is noted that, in some embodiments, the electric vehicle charging station 200 may comprise an RFID reading unit for sensing information of an RFID card, such as a user ID code of an electric vehicle owner.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
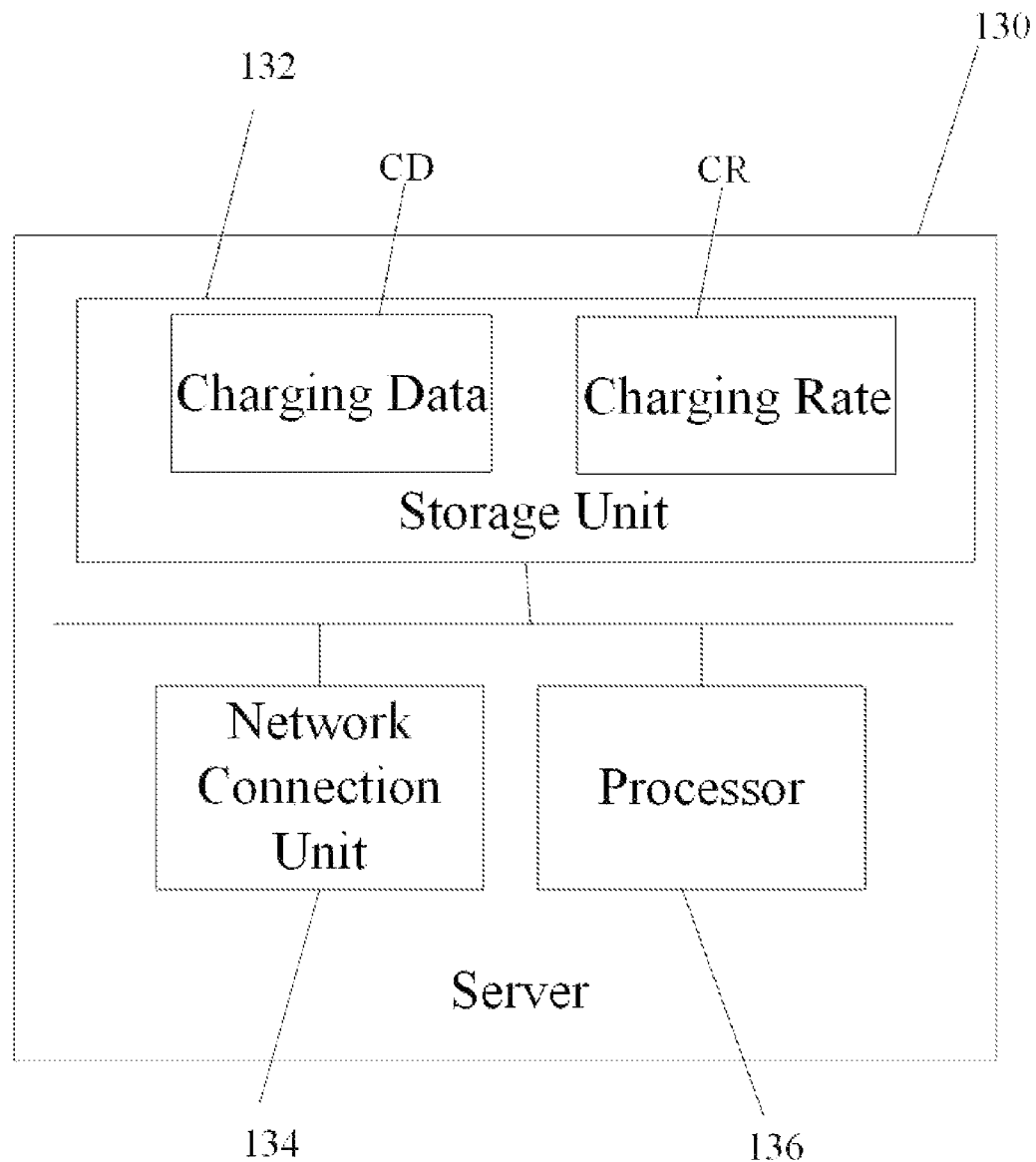
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

Figure 10:
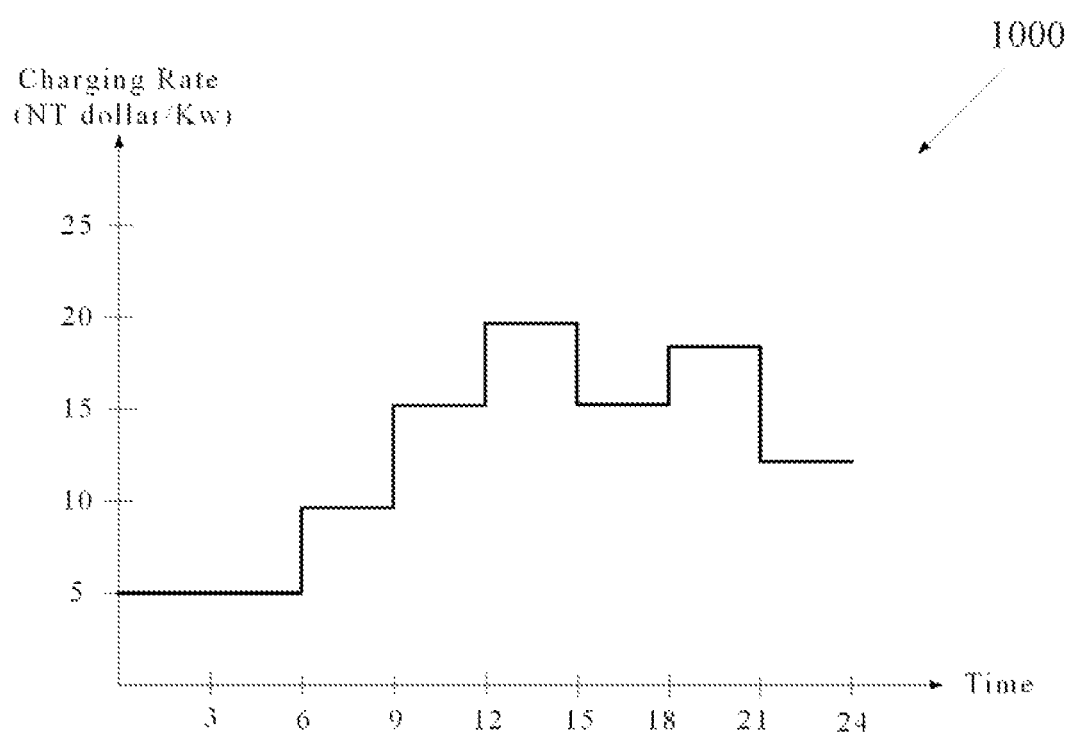
FIG. 10 is a schematic diagram illustrating an embodiment of an example of graphical data of change data corresponding to the charging rate of the invention.

The storage unit 132 may be a memory, which can store and record related data, such as various data of the electric vehicle charging stations. It is noted that, the storage unit 132 may comprise charging data CD and a charging rate CR corresponding to the charging field. The charging data CD is received from the respective electric vehicle charging stations in the charging field via the network. As mentioned above, the charging data CD may comprise a charging start time, a charging period, and an output power corresponding to a charging operation, and/or related information indicating whether a load balancing operation is being performed. The usage status of the electric vehicle charging stations can be known based on the charging data CD. It is reminded that, when the server manages several charging fields, each charging field can have a corresponding charging rate CR. The method for determining the charging rate CR will be discussed later. In some embodiments, the server may record change data corresponding to the charging rate of the charging field over time, and generate graphical data 1000, as shown in FIG. 10 based on the change data. It is noted that, the aforementioned graphic data is only an example, and the present invention is not limited thereto. In addition, in some embodiments, the storage unit 132 may record at least one energy management scheme (not shown in FIG. 3), which records the power distribution logic when a load balancing operation is performed in the charging field, and is used to control the charging operations corresponding to the respective electric vehicle charging stations. It is noted that, the power distribution logic is configured to determine the execution sequence of the respective charging requests corresponding to the respective charging stations under the power limitation of the charging field, and the target power parameter value for the corresponding charging request when it is executed. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the electric vehicle charging management methods with charging rate-based charging of the invention. The relevant details will be described later. It is reminded that, when there are multiple energy management schemes in the server, the processor 136 can select one of the energy management schemes, and perform a load balancing operation for the charging field according to the selected energy management scheme. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
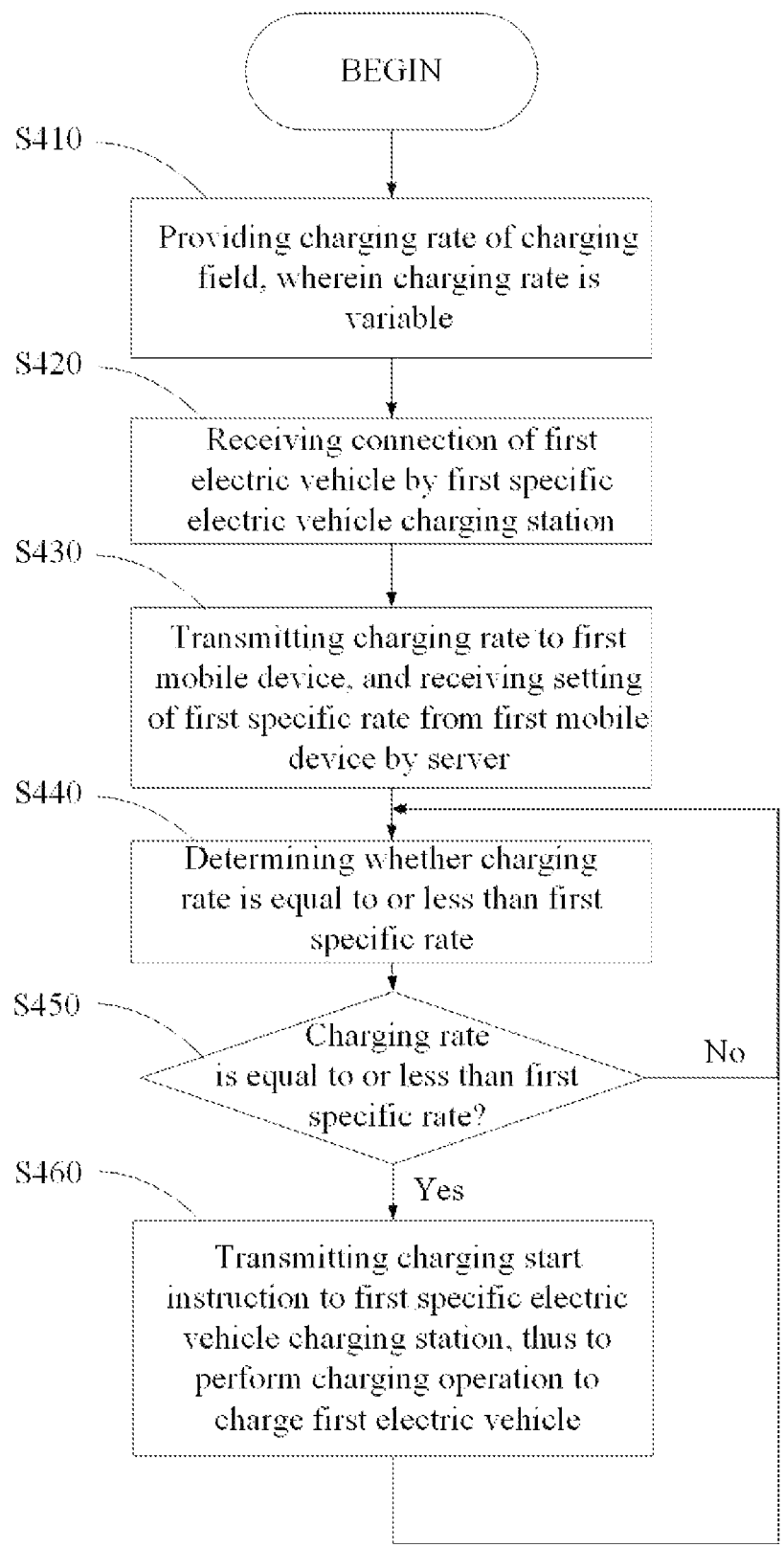
FIG. 4 is a flowchart of an embodiment of an electric vehicle charging management method with charging rate-based charging of the invention.

FIG. 4 is a flowchart of an embodiment of an electric vehicle charging management method with charging rate-based charging of the invention. The electric vehicle charging management method with charging rate-based charging of the invention is applicable to a charging field with a plurality of electric vehicle charging stations, and the charging field has a power limit. The respective electric vehicle charging station in the charging field can be electrically coupled with a remote server via a network.

In step S410, the server provides a charging rate for the charging field. It is noted that, the charging rate of the charging field is variable. That is, the charging rate of the charging field may be changed. In step S420, a first specific electric vehicle charging station among the electric vehicle charging stations receives a connection corresponding to a first electric vehicle. For example, the user can insert the charging gun of the first specific electric vehicle charging station into the charging port of the first electric vehicle. Then, in step S430, the server transmits the charging rate of the charging field to a first mobile device via the network, and receives a setting of a first specific rate from the first mobile device. It is reminded that, in some embodiments, the first mobile device may correspond to the owner of the first electric vehicle. As mentioned above, in some embodiments, the server can record change data corresponding to the charging rate of the charging field over time, and generate graphical data based on the change data. In some embodiments, the server may transmit the graphical data to the first mobile device. In step S440, the server determines whether the charging rate of the charging field is equal to or less than the first specific rate set by the first mobile device. When the charging rate is not equal to or less than the first specific rate (No in step S450), the procedure returns to step S440. When the charging rate is equal to or less than the first specific rate (Yes in step S450), in step S460, the server transmits a charging start instruction to the first specific electric vehicle charging station via the network, so that the first specific electric vehicle charging station starts to perform a charging operation to charge the first electric vehicle. After that, the procedure returns to step S440. It is understood that, since the charging rate of the charging field is variable, the charging rate of the charging field may be higher than the first specific rate. When the charging rate is higher than the first specific rate, the charging operation corresponding to the first electric vehicle will be suspended.

Figure 5:
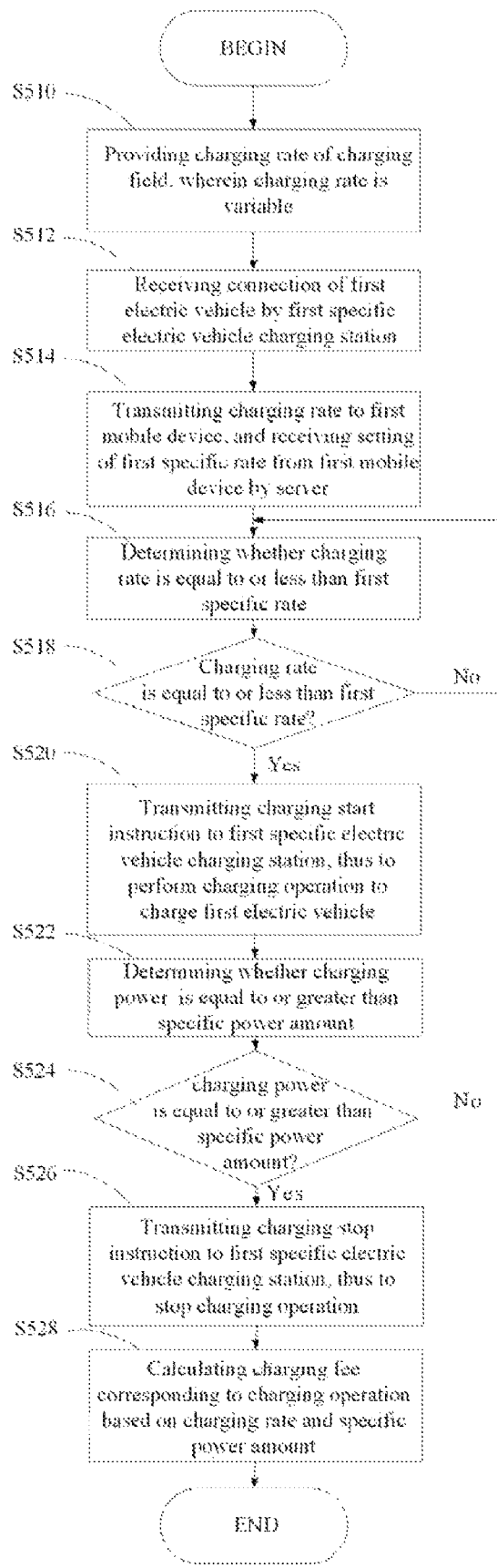
FIG. 5 is a flowchart of another embodiment of an electric vehicle charging management method with charging rate-based charging of the invention.

FIG. 5 is a flowchart of another embodiment of an electric vehicle charging management method with charging rate-based charging of the invention. The electric vehicle charging management method with charging rate-based charging of the invention is applicable to a charging field with a plurality of electric vehicle charging stations, and the charging field has a power limit. The respective electric vehicle charging station in the charging field can be electrically coupled with a remote server via a network.

In step S510, the server provides a charging rate of the charging field. Similarly, the charging rate of the charging field is variable. That is, the charging rate of the charging field may be changed. In step S512, a first specific electric vehicle charging station among the electric vehicle charging stations receives a connection corresponding to a first electric vehicle. Similarly, the user can insert the charging gun of the first specific electric vehicle charging station into the charging port of the first electric vehicle. Then, in step S514, the server transmits the charging rate of the charging field to a first mobile device via the network, and receives a setting of a first specific rate and a specific power amount from the first mobile device. It is reminded that, in some embodiments, the first mobile device may correspond to the owner of the first electric vehicle. Similarly, in some embodiments, the server may record change data corresponding to the charging rate of the charging field over time, and generate graphical data based on the change data. In some embodiments, the server may transmit the graphical data to the first mobile device. In step S516, the server determines whether the charging rate of the charging field is equal to or less than the first specific rate set by the first mobile device. When the charging rate is not equal to or less than the first specific rate (No in step S518), the procedure returns to step S516. When the charging rate is equal to or less than the first specific rate (Yes in step S518), in step S520, the server transmits a charging start instruction to the first specific electric vehicle charging station via the network, so that the first specific electric vehicle charging station starts to perform a charging operation to charge the first electric vehicle. Then, in step S522, the server determines whether the charging power which is charged to the vehicle in the charging operation is equal to or greater than the specific power amount set by the first mobile device. It is reminded that, during the charging operation, the server can receive the charging data from the first specific electric vehicle charging station via the network, and the charging power corresponding to the first electric vehicle that has been charged in the charging operation can be obtained according to the charging data. When the charging power corresponding to the charging operation is not equal to or greater than the specific power amount (No in step S524), the procedure returns to step S516. When the charging power corresponding to the charging operation is equal to or greater than the specific power amount (Yes in step S524), in step S526, the server sends a charging stop instruction to the first specific electric vehicle charging station via the network, so that the first specific electric vehicle charging station stops the charging operation. After that, in step S528, the server calculates a charging fee corresponding to the charging operation according to the charging rate of the charging field and the specific power amount. It is reminded again that, since the charging rate of the charging field is variable, the charging rate of the charging field may be higher than the first specific rate. When the charging rate is higher than the first specific rate, the charging operation of the corresponding first electric vehicle will be suspended. The charging operation will continue until the charging power corresponding to the charging operation reaches the specific power amount set by the first mobile device.

Figure 6:
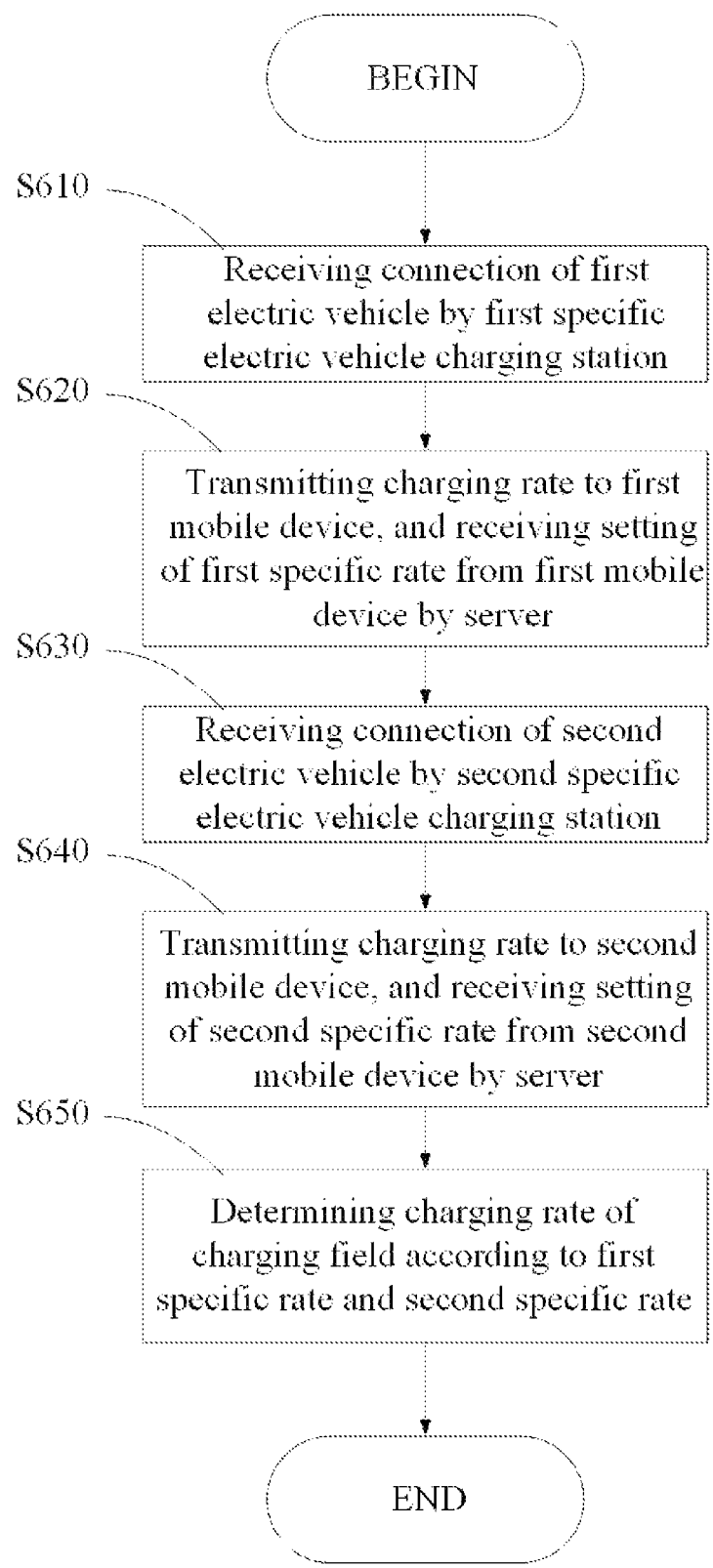
FIG. 6 is a flowchart of an embodiment of a method for adjusting the charging rate in a change adjustment operation of the invention.

As described, the charging rate of the charging field is variable. FIG. 6 is a flowchart of an embodiment of a method for adjusting the charging rate in a change adjustment operation of the invention.

In step S610, a first specific electric vehicle charging station among the electric vehicle charging stations receives a connection corresponding to a first electric vehicle. Similarly, the user can insert the charging gun of the first specific electric vehicle charging station into the charging port of the first electric vehicle. Then, in step S620, the server transmits the charging rate of the charging field to a first mobile device via the network, and receives a setting of a first specific rate from the first mobile device. It is reminded that, in some embodiments, the first mobile device may correspond to the owner of the first electric vehicle. In step S630, a second specific electric vehicle charging station among the electric vehicle charging stations receives a connection corresponding to a second electric vehicle. Similarly, the user can insert the charging gun of the second specific electric vehicle charging station into the charging port of the second electric vehicle. Then, in step S640, the server transmits the charging rate of the charging field to a second mobile device via the network, and receives a setting of a second specific rate from the second mobile device. It is reminded that, in some embodiments, the second mobile device may correspond to the owner of the second electric vehicle. Then, in step S650, the server determines the charging rate of the charging field according to the first specific rate of the first mobile device and the second specific rate of the second mobile device.

Figure 7:
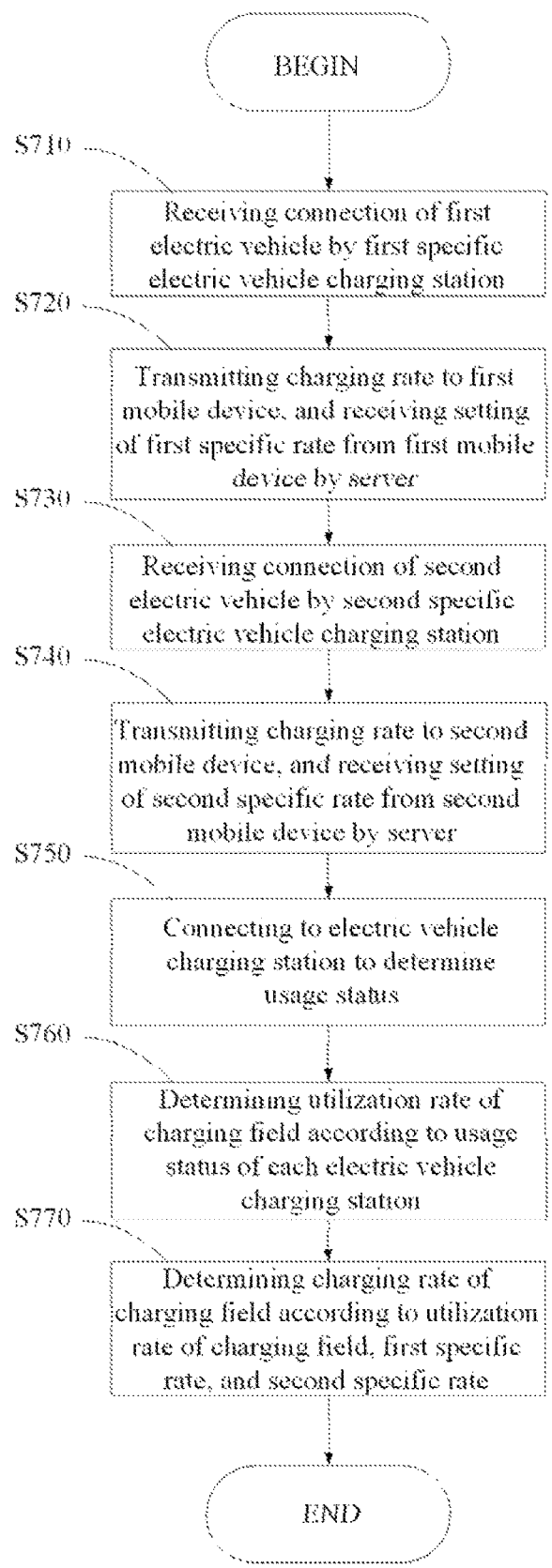
FIG. 7 is a flowchart of another embodiment of a method for adjusting the charging rate in a change adjustment operation of the invention.

FIG. 7 is a flowchart of another embodiment of a method for adjusting the charging rate in a change adjustment operation of the invention.

In step S710, a first specific electric vehicle charging station among the electric vehicle charging stations receives a connection corresponding to a first electric vehicle. Similarly, the user can insert the charging gun of the first specific electric vehicle charging station into the charging port of the first electric vehicle. Then, in step S720, the server transmits the charging rate of the charging field to a first mobile device via the network, and receives a setting of a first specific rate from the first mobile device. It is reminded that, in some embodiments, the first mobile device may correspond to the owner of the first electric vehicle. In step S730, a second specific electric vehicle charging station among the electric vehicle charging stations receives a connection corresponding to a second electric vehicle. Similarly, the user can insert the charging gun of the second specific electric vehicle charging station into the charging port of the second electric vehicle. Then, in step S740, the server transmits the charging rate of the charging field to a second mobile device via the network, and receives a setting of a second specific rate from the second mobile device. It is reminded that, in some embodiments, the second mobile device may correspond to the owner of the second electric vehicle. In step S750, the server connects to the respective electric vehicle charging stations in the charging field via the network to determine the usage status of the respective electric vehicle charging station, and in step S760, determines the utilization rate of the charging field according to the usage status of the respective electric vehicle charging station. Then, in step S770, the server determines the charging rate of the charging field according to the utilization rate of the charging field, the first specific rate of the first mobile device, and the second specific rate of the second mobile device.

It must be noted that, in some embodiments, the change adjustment operation of the charging rate will only be performed under certain specific conditions.

Figure 8:
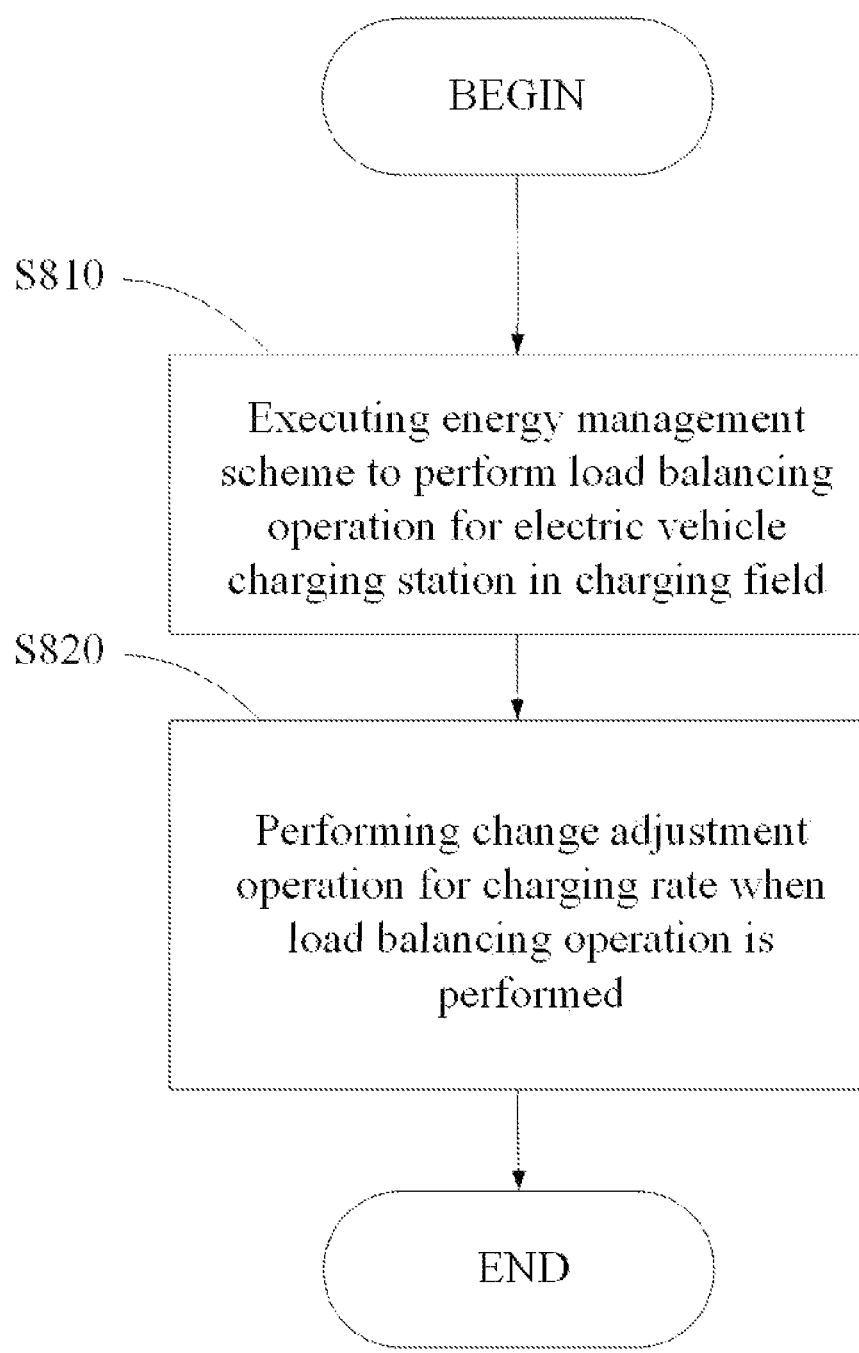
FIG. 8 is a flowchart of an embodiment of a method for determining whether to perform a change adjustment operation of the invention.

FIG. 8 is a flowchart of an embodiment of a method for determining whether to perform a change adjustment operation of the invention. In step S810, the server executes an energy management scheme to perform a load balancing operation for the electric vehicle charging stations in the charging field. It should be noted that, the energy management scheme can record a power distribution logic to control the charging operations for the respective electric vehicle charging stations. In step S820, when the load balancing operation is executed, a change adjustment operation of the charging rate of the charging field is performed. It is reminded that, the change adjustment operation can be as shown in the embodiments of FIG. 6 or FIG. 7.

Figure 9:
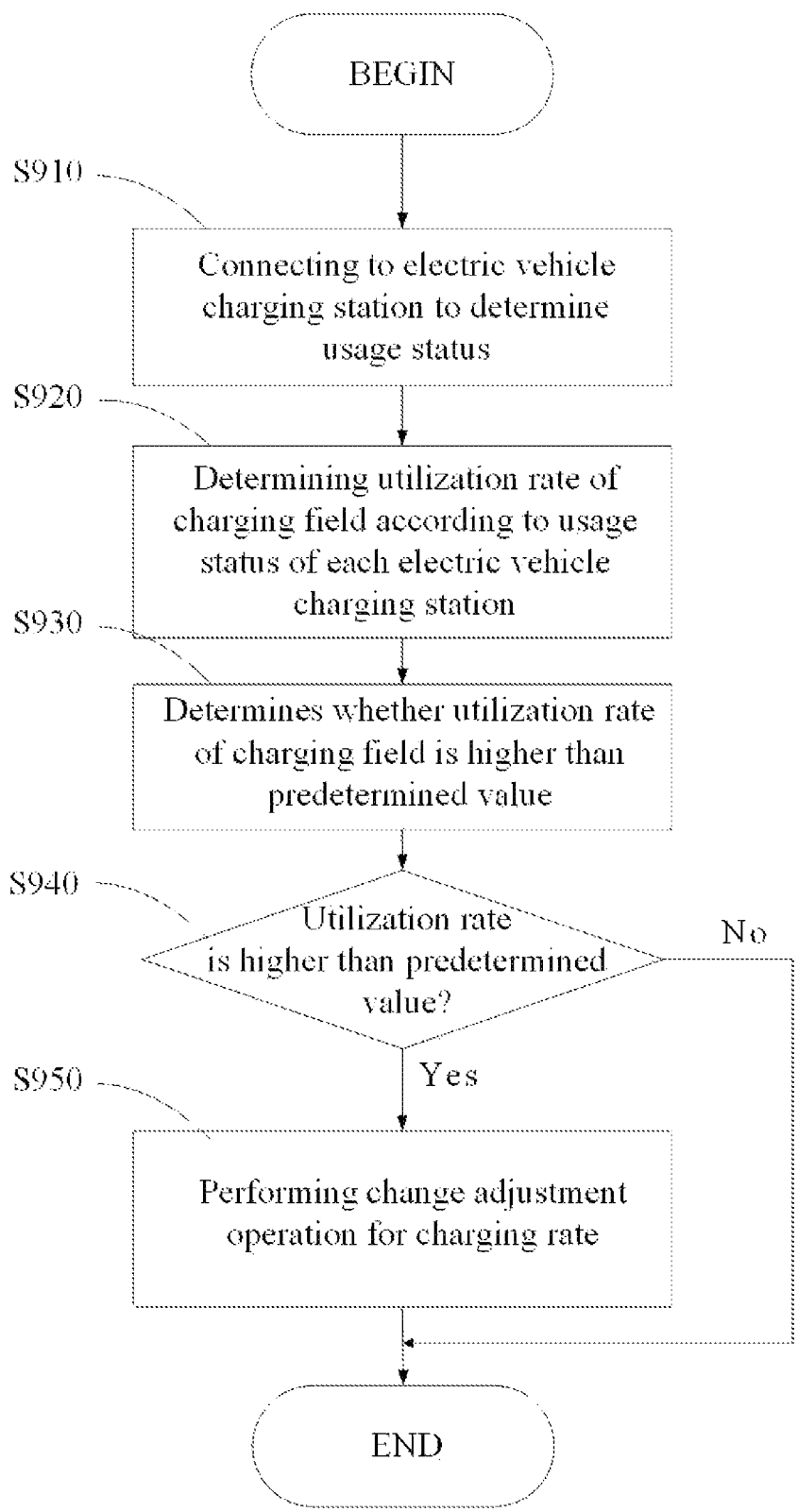
FIG. 9 is a flowchart of another embodiment of a method for determining whether to perform a change adjustment operation of the invention.

FIG. 9 is a flowchart of another embodiment of a method for determining whether to perform a change adjustment operation of the invention. In step S910, the server connects to the respective electric vehicle charging stations in the charging field via the network to determine the usage status of the respective electric vehicle charging station, and in step S920, determines the utilization rate of the charging field according to the usage status of the respective electric vehicle charging station. Then, in step S930, the server determines whether the utilization rate of the charging field is higher than a predetermined value. It is worth noting that, this predetermined value can be different according to different charging fields and requirements. When the utilization rate of the charging field is not higher than the predetermined value (No in step S940), the procedure ends. That is, the change adjustment operation is not performed. When the utilization rate of the charging field is higher than the predetermined value (Yes in step S940), the change adjustment operation of the charging rate of the charging field is performed. Similarly, the change adjustment operation can be as shown in the embodiments in FIG. 6 or FIG. 7.

Therefore, the electric vehicle charging management methods and systems with charging rate-based charging of the present invention can automatically perform the charging operation of the electric vehicle based on the charging rate of the charging field and the specific rate set by the owner himself, thereby increasing the flexibility of charging operations and fee management for electric vehicles.

Electric vehicle charging management methods with charging rate-based charging, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electric vehicle charging management method with charging rate-based charging for use in a charging field with a plurality of electric vehicle charging stations and a server connected with the respective electric vehicle charging stations via a first network, comprising:
providing a charging rate corresponding to the charging field, wherein the charging rate is variable;
receiving a connection of a first electric vehicle by a first specific electric vehicle charging station among the electric vehicle charging stations;
transmitting the charging rate of the charging field to a first mobile device via a second network by the server, and receiving a setting of a first specific rate from the first mobile device,
determining whether the charging rate is equal to or less than the first specific rate; and
transmitting a charging start instruction to the first specific electric vehicle charging station via a first network by the server when the charging rate is equal to or less than the first specific rate, so that the first specific electric vehicle charging station starts to perform a charging operation to charge the first electric vehicle,
wherein the method further comprises:
receiving a connection of a second electric vehicle by a second specific electric vehicle charging station among the electric vehicle charging stations;
receiving a setting of a second specific rate from a second mobile device via a third network by the server;
determining the charging rate corresponding to the charging field according to the first specific rate of the first mobile device and the second specific rate of the second mobile device;
executing an energy management scheme to perform a load balancing operation for the electric vehicle charging stations in the charging field, wherein the energy management scheme records a power distribution logic for controlling the charging operations corresponding to the respective electric vehicle charging stations; and
performing a change adjustment operation for the charging rate corresponding to the charging field when the load balancing operation is performed.

2. The method of claim 1, further comprising:
receiving a setting of a specific power amount from the first mobile device via the second network by the server;
determining whether a charging power corresponding to the charging operation is equal to or greater than the specific power amount; and
transmitting a charging stop instruction to the first specific electric vehicle charging station via the first network by the server when the charging power corresponding to the charging operation is equal to or greater than the specific power amount, so that the first specific electric vehicle charging station stops the charging operation.

3. The method of claim 2, further comprising calculating a charging fee corresponding to the charging operation based on the charging rate of the charging field and the specific power amount by the server.

4. The method of claim 1, further comprising:
connecting to each of the electric vehicle charging stations in the charging field via the first network by the server to determine the usage status of each of the electric vehicle charging stations;
determining the utilization rate of the charging field according to the usage status of each of the electric vehicle charging stations by the server;
determines whether the utilization rate of the charging field is higher than a predetermined value; and
performing the change adjustment operation of the charging rate of the charging field when the utilization rate of the charging field is higher than the predetermined value.

5. The method of claim 4, further comprising determining the charging rate of the charging field according to the utilization rate of the charging field, the first specific rate of the first mobile device, and the second specific rate of the second mobile device.

6. The method of claim 1, further comprising:
recording change data of the charging rate of the charging field over time by the server; and
generating graphical data based on the change data, and transmitting the graphical data to the first mobile device via the second network by the server.

7. An electric vehicle charging management system with charging rate-based charging, comprising:
a charging field with a plurality of electric vehicle charging stations, wherein a first specific electric vehicle charging station among the electric vehicle charging stations receives a connection of a first electric vehicle; and a server connecting with the respective electric vehicle charging stations via a first network, providing a charging rate corresponding to the charging field, wherein the charging rate is variable, transmitting the charging rate of the charging field to a first mobile device via a second network, receiving a setting of a first specific rate from the first mobile device, determining whether the charging rate is equal to or less than the first specific rate, and transmitting a charging start instruction to the first specific electric vehicle charging station via a first network when the charging rate is equal to or less than the first specific rate, so that the first specific electric vehicle charging station starts to perform a charging operation to charge the first electric vehicle, wherein a second specific electric vehicle charging station among the electric vehicle charging stations further receives a connection of a second electric vehicle, and the server further receives a setting of a second specific rate from a second mobile device via a third network, and determines the charging rate corresponding to the charging field according to the first specific rate of the first mobile device and the second specific rate of the second mobile device, and the server further connects to each of the electric vehicle charging stations in the charging field via the first network to obtain the usage status of each of the electric vehicle charging stations, determines the utilization rate of the charging field according to the usage status of each of the electric vehicle charging stations, determines whether the utilization rate of the charging field is higher than a predetermined value, and performs a change adjustment operation of the charging rate of the charging field when the utilization rate of the charging field is higher than the predetermined value.

8. The system of claim 7, wherein the server further receives a setting of a specific power amount from the first mobile device via the second network, determines whether a charging power corresponding to the charging operation is equal to or greater than the specific power amount, and transmits a charging stop instruction to the first specific electric vehicle charging station via the first network when the charging power corresponding to the charging operation is equal to or greater than the specific power amount, so that the first specific electric vehicle charging station stops the charging operation.

9. The system of claim 8, wherein the server further calculates a charging fee corresponding to the charging operation based on the charging rate of the charging field and the specific power amount.

10. The system of claim 7, wherein the server further executes an energy management scheme to perform the load balancing operation for the electric vehicle charging stations in the charging field, wherein the energy management scheme records a power distribution logic for controlling the charging operations corresponding to the respective electric vehicle charging stations, and performs a change adjustment operation for the charging rate corresponding to the charging field when the load balancing operation is performed.

11. The system of claim 7, wherein the server determines the charging rate of the charging field according to the utilization rate of the charging field, the first specific rate of the first mobile device, and the second specific rate of the second mobile device.

12. The system of claim 7, wherein the server further records change data of the charging rate of the charging field over time, generates graphical data based on the change data, and transmits the graphical data to the first mobile device via the second network.

13. A machine-readable storage medium comprising a computer program, which, when executed, causes a device to perform an electric vehicle charging management method with charging rate-based charging for use in a charging field with a plurality of electric vehicle charging stations and a server connected with the respective electric vehicle charging stations via a first network, wherein the method comprises:

providing a charging rate corresponding to the charging field, wherein the charging rate is variable;

receiving a connection of a first electric vehicle by a first specific electric vehicle charging station among the electric vehicle charging stations;

transmitting the charging rate of the charging field to a first mobile device via a second network by the server, and receiving a setting of a first specific rate from the first mobile device, determining whether the charging rate is equal to or less than the first specific rate;

transmitting a charging start instruction to the first specific electric vehicle charging station via a first network by the server when the charging rate is equal to or less than the first specific rate, so that the first specific electric vehicle charging station starts to perform a charging operation to charge the first electric vehicle;

receiving a connection of a second electric vehicle by a second specific electric vehicle charging station among the electric vehicle charging stations;

receiving a setting of a second specific rate from a second mobile device via a third network by the server;

determining the charging rate corresponding to the charging field according to the first specific rate of the first mobile device and the second specific rate of the second mobile device;

executing an energy management scheme to perform a load balancing operation for the electric vehicle charging stations in the charging field, wherein the energy management scheme records a power distribution logic for controlling the charging operations corresponding to the respective electric vehicle charging stations; and performing a change adjustment operation for the charging rate corresponding to the charging field when the load balancing operation is performed.

* * * * *